United States Patent [19]
Johnson et al.

[11] 3,755,229

[45] Aug. 28, 1973

[54] FOUNDRY CORE COMPOSITIONS

[75] Inventors: Calvin K. Johnson, Palos Heights; Robert A. Laitar, Chicago, both of Ill.

[73] Assignee: CPC International Inc., Englewood Cliffs, Calif.

[22] Filed: July 20, 1971

[21] Appl. No.: 164,458

[52] U.S. Cl............ 260/29.3, 260/38, 260/DIG. 40, 164/43
[51] Int. Cl...................... C08g 51/24, C08g 51/04
[58] Field of Search................... 260/29.3, 56, 57 A, 260/38, DIG. 40; 164/22, 43

[56] References Cited
UNITED STATES PATENTS

| | | | |
|---|---|---|---|
| 2,915,492 | 12/1959 | Wilson et al. | 260/38 |
| 3,008,205 | 11/1961 | Blaies | 260/DIG. 40 |
| 3,057,026 | 10/1962 | Blaies et al. | 164/43 |
| 3,184,814 | 5/1965 | Brown | 164/43 |
| 3,408,327 | 10/1968 | Labat | 260/38 X |
| 3,513,223 | 5/1970 | Smart et al. | 260/57 A |
| 3,549,584 | 12/1970 | Sekera | 260/38 |

*Primary Examiner*—Lorenzo B. Hayes
*Attorney*—Frank E. Robbins, John B. Goodman et al.

[57] ABSTRACT

A foundry core composition comprising sand and a binder comprising phenolic resole resin, furfuryl alcohol and a catalyst selected from the group consisting of stannic chloride and stannous chloride.

5 Claims, No Drawings

3,755,229

FOUNDRY CORE COMPOSITIONS

BACKGROUND OF THE INVENTION

The field of this invention relates to resin binder compositions.

In the foundry industry, processes involving the use of shell molds and cores formed from sand and a resinous binder are well known. Normally such processes involve intimately mixing sand particles with a small quantity of thermosetting resin, forming the mixture into a desired shape, and curing the resin in the mixture by heating the shaped mass at elevated temperatures. The resulting mold or core is of adequate hardness to shape molten metals poured thereover to form a metal cast.

Foundry cores and molds produced by the "hot box process" in which the sand and binder are invested on a heated pattern, cured and ejected from the pattern are especially advantageous since this process can be carried out at high speed. Heretofore, the most important resin binders used in the hot box process have comprised phenol-urea-formaldehyde resins or furfuryl alcohol-urea-formaldehyde resins. In the presence of an acid catalyst, for example, ammonium chloride, ferric chloride, and ferric sulfate, these resin systems cure rapidly and give high tensile strengths. (Examples of the hot box process and suitable binder compositions are disclosed in U.S. Pat. No. 3,059,297 to Dunn and Pfaff and U.S. Pat. No. 3,480,573 to Thompson and Foley). The binder systems used heretofore are useful in many high speed production operations where a high percentage of nitrogen from urea and ammonium salts do not cause difficulties. In certain types of metal casting operations, however, high percentages of nitrogen can cause pinholing and other casting defects. In particular, steel castings are particularly sensitive to nitrogen pinholing.

Resin binder systems containing no nitrogen have been disclosed. For example, U.S. Pat. No. 3,184,814 to Brown discloses a resin binder comprising furfuryl alcohol, phenolic resin and sulfuric acid catalyst for use in forming foundry mold compositions. This resin binder system, however, is not useful in a high speed production operation because it does not cure quickly to high tensile strengths.

A desirable resin binder suitable for use in a hot box process would cure rapidly, and be nitrogen-free or contain smaller amounts of available nitrogen as compared to conventional hot box resin binder systems.

SUMMARY OF THE INVENTION

This invention presents a resin binder composition suitable for use in forming foundry molds which can contain reduced amounts of nitrogen or no nitrogen. The novel binder compositions of this invention comprise (a) from about 85 to 99.5 parts, by weight, resin-forming component comprising furfuryl alcohol and phenolic resole resin, the weight ratio of the furfuryl alcohol to phenolic resole resin being from about 0.05:1 to 1.2:1; (b) from about 0.5 to 15 parts, by weight, catalyst component comprising stannic chloride, stannous chloride and mixtures thereof; and (c) an amount of water at least sufficient to dissolve the catalyst. It has been surprisingly found that the inclusion of the particular catalyst employed in this composition gives binders which can be cured especially rapidly to high tensile strength.

DESCRIPTION OF THE INVENTION AND ITS PREFERRED EMBODIMENTS

This invention relates to novel binder compositions which are especially useful in forming shell molds and cores. These novel binder compositions comprise (a) from about 85 to about 99.5 parts, by weight, resin-forming component comprising furfuryl alcohol and phenolic resole resin, the weight ratio of the furfuryl alcohol to phenolic resole resin being from about 0.05:1 to 1.2:1; (b) from about 0.5 to 15 parts, by weight, catalyst component comprising stannic chloride, stannous chloride and mixtures thereof; and (c) an amount of water at least sufficient to dissolve the catalyst. Preferably, the ratio of the furfuryl alcohol to the phenolic resole resin in the resin component is from about 0.1:1 to 0.8:1, and preferably the catalyst component comprises from about 1 to 10 parts, by weight, of the binder composition.

Phenolic resole resins suitable for use in this invention are well known. Suitable phenolic resole resins can be prepared by reacting one or more moles of formaldehyde per mole of phenolic compound in the presence of a basic catalyst, as for example, sodium hydroxide. Useful phenolic compounds include, for example, phenol, o-cresol, m-cresol, bisphenol-A, p-t-butyl phenol and mixtures thereof. Phenol is the preferred phenolic compound. Preferably, the ratio of formaldehyde to phenolic compound is from about 1.5:1 to 3:1 on a mole basis, and preferably the reaction is carried out at an elevated temperature, as for example from about 55° to 90° C. If it is not stopped, the reaction between the phenolic compound and the formaldehyde will proceed with cross-linking to a gelled structure. However, by cooling the reaction mixture the rate of reaction may be slowed, and for practical purposes stopped at any point short of gelatinization. Thus phenolic resole resins of low molecular weight can be prepared. The phenolic resole resins most useful in this invention are phenolic resole resins wherein the cross-linking reaction has been stopped prior to completion such that the resin has a water dilutability of greater than 100 percent. For example, suitable phenolic resole resins can exhibit water dilutabilities of from about 150 to 5,000 percent or more. Suitable phenolic resole resins include, for example, phenolic resole resins which are soluble in water and therefore exhibit essentially infinite water dilutability.

Water dilutability of phenolic resole resin expressed in terms of weight percent is defined herein as follows:

$$\text{Water dilutability} = \frac{\text{Weight of water}}{\text{Weight of resin}} \times 100,$$

wherein "weight of water" is the amount of water necessary to cause a particular weight of resin to become cloudy or precipitate at 25° C, and "weight of resin" is the particular weight of resin employed in the determination.

After the cross-linking reaction has proceeded to the desired extent, the pH of the mixture is preferably adjusted to from about 6 to 8.

Furfuryl alcohol suitable for use in the invention includes monomeric furfuryl alcohol, and low viscosity polymers thereof, for example, polymers having a viscosity less than 500 centipoises.

The catalyst component of the invention is preferably utilized in the form of a solution comprised of from about 5 percent to about 35 percent, most preferably from 10 to 25 percent, by weight, stannic chloride, stannous chloride, and mixtures thereof, and the balance water. Aqueous solutions of stannic chloride are especially preferred. The addition to the catalyst component of up to about 5 percent, by weight of catalyst, of a strong acid can be desirable. A strong acid can be especially desirable when the binder composition is to be used as a binder for high acid demand sands. Suitable strong acids include, for example, oxalic acid, sulfamic acid and phosphoric acid.

In the absence of a catalyst a mixture of the phenolic resole resin and furfuryl alcohol comprising the resin-forming component of the composition of the invention is relatively stable and too slow curing to be commercially useful. It has been surprisingly found that the particular catalyst component of this invention when employed with the phenolic resole resin and furfuryl alcohol components provide binder compositions which cure especially fast to high tensile strengths. Since the catalyst component promotes the cure of the resin-forming component, in practice the two components are kept separate until just prior to use.

The binder compositions of this invention are useful in a variety of applications. For example, the compositions can be useful in binding particulate materials, such as sand, to form rigid structures, and in forming paper laminates. The compositions are especially useful for forming foundry core compositions employed in forming foundry cores and molds by hot box processes.

Novel foundry core compositions employing the binder compositions of this invention are prepared by mixing the binder composition and sand. Particularly suitable foundry compositions can be formed by mixing from about 0.5 percent to about 4 percent, preferably about 1 percent to about 3 percent, by weight of sand, of the binder composition of this invention with sand in a manner such that the binder composition is coated on to the sand.

In practice, sutiable foundry core compositions can be formed in a variety of ways. For example, the foundry core compositions can be formed in a one-step process by adding the binder compositions of the invention to sand and mixing the resulting mixture to obtain a coated sand. Suitable foundry compositions can also be obtained by a two-step process. One such process can involve first adding the phenolic resole resin and furfuryl alcohol constituents of the binder composition to the sand and mixing to form a mixture of the resin forming component and sand, and in a second step adding the catalyst component. Similarly, another two step process can involve first forming a mixture of sand and a suitable amount of the catalyst component, and in a second step adding a suitable amount of the phenolic resole resin and furfuryl alcohol constituents of the binder compositions of the invention. This latter process is a preferred manner of forming foundry core compositions. In forming the foundry core compositions, an amount of water can be added to the sand, or included with the binder composition, to obtain a desirable consistency suitable for coating the sand. Suitable amounts of water can be from about 3 to 30 percent based on the weight of the resin-forming component of the binder composition. Preferably, the phenolic resole resin and furfuryl alcohol components are added to the sand in the form of an aqueous solution or water mixture, and preferably the catalyst component of the binder is added to the sand in the form of an aqueous solution.

The binder compositions of this invention can contain from 0 to 15 percent, by weight of the binder composition, of suitable modifiers. Suitable modifiers can include sugars and urea. Sugars, for example, corn syrup and molasses, can reduce the cost and improve the collapsability of foundry molds formed with the binder compositions of this invention. Urea can increase tensile strength and reduce formaldehyde odor which is associated with the binder composition. Binder compositions comprising from 1 to 15 percent, preferably from 4 to 10 percent, urea can be especially useful. Preferably the urea is associated with the catalyst component as an aqueous mixture. The binder composition containing urea should be employed only in those foundry operations in which nitrogen can be tolerated.

The following examples illustrate with particularity several preferred embodiments of the invention.

EXAMPLE I

PART A (Resin-Forming Component)

A phenolic resole resin was formed in the following manner: a mixture of 836 parts of phenol, 2,164 parts of a 37 percent aqueous formaldehyde solution and 16.7 parts of a 50 percent aqueous sodium hydroxide solution was formed. The mixture was heated to a temperature of 70° C. and held at that temperature for 4 hours. The mixture was then cooled to 40° C and the pH was adjusted to 7.2 by the addition of hydrochloric acid. The mixture was then dehydrated at a temperature of from 45° to 50° C under vacuum to give an aqueous resole resin mixture containing 20 percent, by weight, water. This mixture had a refractive index of 1.550 and a viscosity of 2,000 cps. The phenolic resole resin formed had a water dilutability greater than 100 percent.

Three hundred and nineteen parts of this mixture (containing 255 parts of phenolic resole resin) and 150 parts of furfuryl alcohol were mixed together to form a resin-forming component of a binder composition of this invention.

PART B (Catalyst Component)

Twelve parts stannic chloride were mixed with 88 parts water to form an aqueous solution of a catalyst component of a binder composition of this invention. When this catalyst component is mixed with the resin-forming component in Part A, a binder composition of this invention is obtained.

PART C (Prior Art Catalyst)

Twelve parts ammonium chloride were mixed with 88 parts water to form an aqueous solution. Ammonium chloride is not a catalyst component of this invention, but it is presented herein for comparative purposes to demonstrate the advantages of the invention.

PART D (Foundry Core Composition)

A foundry core composition was prepared by placing 5.5 pounds washed and dried silica sand in the bowl of a Kitchen Aid mixer. The mixer was turned on and a quantity of the aqueous stannic chloride solution of Part B weighing 0.0165 pound was added to the mixer bowl. After about one minute the catalyst was adequately mixed with the sand. A quantity of the aqueous resin-forming component of Part A weighing 0.11 pound was then added mixer bowl. After about two minutes, the sand was coated with the resin. The resulting resin coated sand is a foundry composition of this invention coated with a binder composition of this invention.

Molded specimens formed with this foundry composition were prepared by blowing this foundry composition into a test briquet mold heated to 425° F, and curing this composition for various lengths of time. The resulting briquets were removed from the mold and their tensile strengths were determined using a Universal 700 sand tester in the manner set forth by the American Foundrymen's Society. Hot tensiles were determined by testing the briquets immediately upon removal from the mold. Cold tensiles were determined after a 30 minute cooling period. The results were as follows:

| Cure Time | Cold Tensile Strength (pounds per square inch) |
|---|---|
| 10 sec. cure | 155 |
| 20 sec. cure | 370 |
| 30 sec. cure | 330 |
| 45 sec. cure | 300 |
| | Hot Tensile Strength |
| 45 sec. cure | 66 |

PART E (Comparative Foundry Core Composition)

A foundry core composition was prepared as in Part D, except that the ammonium chloride solution of Part C was employed instead of the stannic chloride solution of Part B. The resulting resin coated sand was not coated with a binder composition of this invention, and was not a foundry composition of this invention. Molded specimens were formed and tested for tensile strength as in Part D. The results were as follows:

| Cure Time | Cold Tensile Strength (pounds per square inch) |
|---|---|
| 10 sec. cure | 0 |
| 20 sec. cure | 0 |
| 30 sec. cure | 20 |
| 45 sec. cure | 15 |
| | Hot Tensile Strength |
| 45 sec. cure | 10 |

This binder composition does not cure rapidly to high tensile strengths as do the binder compositions of the invention.

EXAMPLE II

PART A (Resin-Forming Component)

A phenolic resole resin was formed in the following manner: a mixture of 700 parts of phenol, 1,426 parts of 37 percent aqueous formaldehyde and 14 parts of lime was formed. The mixture was heated to 70° C and held at that temperature for 4 hours. The mixture was then cooled to 40° C and the pH was adjusted to 7.0 by the addition of hydrochloric acid. The mixture was then dehydrated at a temperature of 45° C under vacuum to give an aqueous resole resin mixture containing 14 percent, by weight, water. This mixture had a refractive index of 1.570, and viscosity of 2,200 cps. The phenolic resole resin formed had a water dilutability greater than 100 percent.

Fourteen hundred parts of this mixture (containing 1,204 parts of phenolic resole resin) and 600 parts of furfuryl alcohol were mixed together to form a resin-forming component of this invention.

PART B (Catalyst Component)

Twelve parts stannic chloride were mixed with 88 parts water to form an aqueous solution of a catalyst component of a binder composition of this invention. When this catalyst component is mixed with the resin-forming component in Part A, a binder composition of this invention is obtained.

PART C (Foundry Core Composition)

A foundry core composition was prepared by placing 5.5 pounds washed and dried silica sand in the bowl of a Kitchen Aid mixer. The mixer was turned on and a quantity of the aqueous stannic chloride solution of Part B weighing 0.0165 pound was added to the mixer bowl. After about one minute the catalyst was adequately mixed with the sand. A quantity of the aqueous resin-forming component of Part A weighing 0.11 pound was then added to the mixer bowl. After about two minutes, the sand was coated with the resin. The resulting resin coated sand is a foundry composition of this invention coated with a binder composition of this invention.

Molded specimens formed with this foundry composition were prepared by blowing this foundry composition into a test briquet mold heated to 425° F, and curing this composition for various lengths of time. The resulting briquets were removed from the mold and their tensile strengths were determined using a Universal 700 sand tester in the manner set forth by the American Foundrymen's Society. Hot tensiles were determined by testing the briquets immediately upon removal from the mold. Cold tensiles were determined after a 30 minute cooling period. The results were as follows:

| Cure Time | Cold Tensile Strength (pounds per square inch) |
|---|---|
| 10 sec. cure | 180 |
| 20 sec. cure | 350 |
| 30 sec. cure | 580 |
| 45 sec. cure | 600 |
| | Hot Tensile Strength |
| 45 sec. cure | 75 |

This binder composition of this invention cured rapidly to high tensile strengths.

EXAMPLE III

When in Example II, stannous chloride is employed instead of stannic chloride, similar results are obtained in that a binder composition and a foundry core composition can be obtained which cure rapidly to high tensile strengths.

EXAMPLE IV

When in Example II, o-cresol is employed instead of phenol similar results are obtained in that a binder composition and a foundry core composition can be obtained which cure rapidly to high tensile strengths.

Unless otherwise stated, all parts and percentages herein refer to a weight basis.

What is claimed is:

1. A foundry core composition comprising a mixture of sand, and from about 0.5 to 4 percent, by weight of sand, of a binder composition comprising:
   a. from about 85 parts to about 99.5 parts, by weight, resin-forming component comprising furfuryl alcohol and phenolic resole resin, the weight ratio of the furfuryl alcohol to phenolic resole resin being from about 0.05:1 to 1.2:1;
   b. from about 0.5 to 15 parts, by weight, catalyst component comprising stannic chloride, stannous chloride and mixtures thereof; and c. an amount of water at least sufficient to dissolve the catalyst.

2. The foundry core composition of claim 1 wherein the phenolic resole vesin has a water dilutability of at least 100 percent.

3. The foundry core composition of claim 2 wherein the catalyst component is stannic chloride.

4. The foundry core composition of claim 3 having from about 1 to 10 parts, by weight, stannic chloride.

5. The foundry core composition of claim 4 wherein the ratio of furfuryl alcohol to phenolic resole resin is from about 0.1:1 to 0.8:1.

* * * * *

PO-1050
(5/69)

UNITED STATES PATENT OFFICE
CERTIFICATE OF CORRECTION

Patent No. __3,755,229__  Dated __August 28, 1973__

Inventor(s) __Calvin K. Johnson and Robert A. Laitar__

It is certified that error appears in the above-identified patent and that said Letters Patent are hereby corrected as shown below:

"Assignee: CPC International Inc., Englewood Cliffs, Calif." should read ---Asignee: CPC International Inc., Englewood Cliffs, New Jersey--;

Column 7, line 4, "vesin" should be ---resin---.

Signed and sealed this 1st day of January 1974.

(SEAL)
Attest:

EDWARD M. FLETCHER, JR.
Attesting Officer

RENE D. TEGTMEYER
Acting Commissioner of Patents